United States Patent
Venkatachalam et al.

(10) Patent No.: US 8,018,890 B2
(45) Date of Patent: Sep. 13, 2011

(54) TECHNIQUES USING A HOP-BY-HOP APPROACH FOR AUTOMATIC REPEAT REQUEST (ARQ) IN WIRELESS RELAY NETWORKS

(75) Inventors: Muthaiah Venkatachalam, Beaverton, OR (US); Xiangying Yang, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 200 days.

(21) Appl. No.: 12/215,343

(22) Filed: Jun. 25, 2008

(65) Prior Publication Data

US 2009/0323770 A1    Dec. 31, 2009

(51) Int. Cl.
*H04B 7/14* (2006.01)

(52) U.S. Cl. ........ 370/315; 370/279; 370/328; 714/746; 714/748

(58) Field of Classification Search .................. 370/315, 370/349, 236, 335, 342, 431, 331, 328, 329; 455/436, 49
See application file for complete search history.

(56) References Cited

U.S. PATENT DOCUMENTS

| | | | | |
|---|---|---|---|---|
| 7,630,355 B2* | 12/2009 | Tao et al. | | 370/343 |
| 2004/0205105 A1 | 10/2004 | Larsson et al. | | |
| 2007/0168826 A1* | 7/2007 | Terry et al. | | 714/748 |
| 2007/0190933 A1* | 8/2007 | Zheng et al. | | 455/7 |
| 2007/0280193 A1* | 12/2007 | Kim et al. | | 370/349 |
| 2008/0144626 A1* | 6/2008 | Bertinelli et al. | | 370/392 |
| 2008/0212541 A1* | 9/2008 | Vayanos et al. | | 370/335 |
| 2009/0049356 A1* | 2/2009 | Lin | | 714/749 |
| 2009/0073916 A1* | 3/2009 | Zhang et al. | | 370/315 |
| 2009/0109892 A1* | 4/2009 | Oyman et al. | | 370/315 |
| 2009/0235139 A1* | 9/2009 | Park et al. | | 714/750 |
| 2009/0254790 A1* | 10/2009 | Pi et al. | | 714/749 |
| 2010/0115363 A1* | 5/2010 | Seo et al. | | 714/748 |
| 2010/0275087 A1* | 10/2010 | Doppler et al. | | 714/749 |

FOREIGN PATENT DOCUMENTS

| | | |
|---|---|---|
| EP | 1096719 A2 | 5/2001 |
| WO | 2005/008947 A1 | 1/2005 |
| WO | 2009/158195 A2 | 12/2009 |
| WO | 2009/158195 A3 | 2/2010 |

OTHER PUBLICATIONS

International Search Report and Written Opinion received for PCT Patent Application No. PCT/US2009/046923, mailed on Dec. 28, 2009, 11 pages.
International Preliminary Report on Patentability received for PCT Patent Application No. PCT/US2009/046923, mailed on Jan. 13, 2011, 6 pages.

* cited by examiner

*Primary Examiner* — Michael J Moore, Jr.
(74) *Attorney, Agent, or Firm* — Thorpe North & Western LLP

(57) ABSTRACT

An embodiment of the present invention provides an apparatus, comprising a transceiver adapted for use in a hop by hop (HbH) relay network and configured to enable fast error correction and reduce ARQ overhead by coupling HARQ and ARQ feedback signaling in each hop of the HbH relay network.

16 Claims, 8 Drawing Sheets

TECHNIQUES USING A HOP-BY-HOP APPROACH FOR AUTOMATIC REPEAT REQUEST (ARQ) IN WIRELESS RELAY NETWORKS

BACKGROUND

The performance of typical Internet applications-like transfer connect protocol (TCP) and voice over Internet protocol (VoIP) suffers from unreliable wireless communications. It has been shown that one can achieve significant performance gains by improving the communication reliability at the physical (PHY) and link layer.

Automatic Repeat reQuest (ARQ) is a widely used media access control (MAC) layer protocol that ensures end-to-end communication reliability. Typical implementations include designs such as Stop-and-Wait and Go-Back-N ARQs.

ARQ is particularly useful in wireless networks, where unreliable wireless channels can often cause packet transmission errors. Some errors or packet loss, if uncorrected and passed to the upper transport layer, will lead to very poor end-to-end performance, for popular transport protocols such TCP. For example in mobile WiMAX systems (based on the IEEE802.16e standard), a sliding window based ARQ protocol is defined at the MAC layer to:

Ensure reliable packet delivery;
Enable optional in-order packet delivery; and
Protect against any physical layer (PHY) feedback error.

In the next generation broadband wireless networks, relay networks are a promising solution to enhance cell coverage and network capacity. Although the benefits are significant, relay networks pose new challenges in the network protocol design. For ARQ, the important question is whether ARQ should be implemented as an end-to-end (E2E) protocol or a hop-by-hop (HbH) protocol.

The present invention poses a solution to the problems set forth above and an answer to this question.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
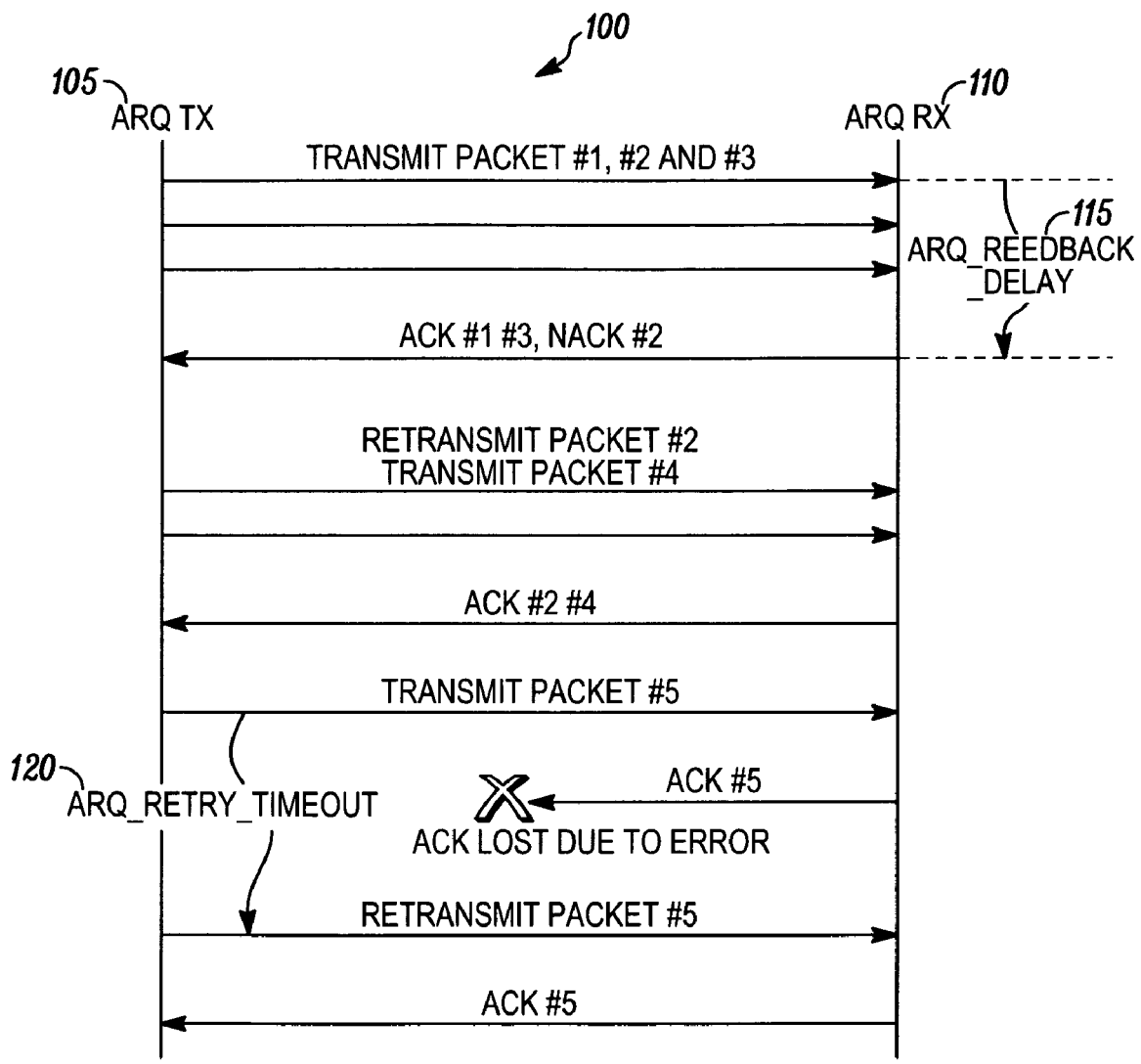
FIG. 1 illustrates an example of a sliding-window based ARQ operation an embodiment of the present invention.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Embodiments of the invention may be used in a variety of applications. Some embodiments of the invention may be used in conjunction with various devices and systems, for example, a transmitter, a receiver, a transceiver, a transmitter-receiver, a wireless communication station, a wireless communication device, a wireless Access Point (AP), a modem, a wireless modem, a Personal Computer (PC), a desktop computer, a mobile computer, a laptop computer, a notebook computer, a tablet computer, a server computer, a handheld computer, a handheld device, a Personal Digital Assistant (PDA) device or a handheld PDA device.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. For example, "a plurality of stations" may include two or more stations.

Hybrid Automatic Repeat reQuest (ARQ), HARQ, is "a must" for a communication system PHY layer, to enhance error correction and spectral efficiency. On the other hand, ARQ is there to stay in any communication system and cannot be replaced by HARQ. Their interaction has to be considered in designing a wireless networks.

Wireless Relay as a promising deployment model provides many benefits, such as better coverage, higher capacity and quick deployment. The Institute for Electronic and Electrical Engineers (IEEE) 802.16m SRD has relay as one key option. In this context, how ARQ along with HARQ should be designed is crucial for system performance in every aspect: link reliability, spectral efficiency, packet delay and handover performance etc.

An embodiment of the present invention provides a very important feature that allows HARQ-ARQ coupling in HbH ARQ design. This provides the fastest error recovery and minimizes ARQ feedback overhead. In addition, one of ARQ's key function "in-order packet delivery", missing in all existing research, is provided in some embodiments of the present invention. Embodiments of the present invention further provide an ARQ state machine that is the most complete and state of the art, which not only cover HbH ARQ, but also HARQ-ARQ coupling and potential handover in a relay network.

Turning now to FIG. 1 at 100 is a diagram for operation of an embodiment of the present invention with ARQ transmission at 105 and ARQ reception at 110. ARQ_Feedback_Delay 115 is the time that receiver (RX) 110 side waits before sending a feedback. This timer needs to accommodate delays of a few transmissions (for reducing feedback overheads) plus delay fluctuations due to scheduling. ARQ_RETRY_TIMEOUT 120 is the timer that triggers the automatic retransmission at the transmitter (TX) 105 side, if no feedback has been received. This timer needs to be a few timers larger than ARQ_Feedback_Delay 115 to accommodate fluctuations in round-trip delay.

Figure 2:
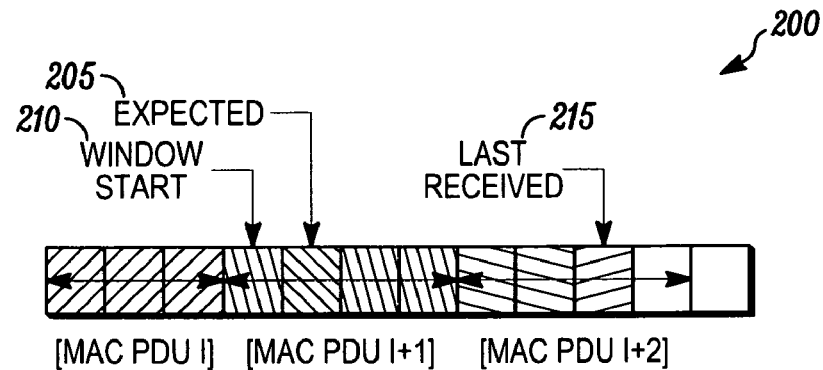
FIG. 2 illustrates an ARQ's sliding window operation of an embodiment of the present invention.

Turning now to FIG. 2 at 200 is an illustration of an ARQ's sliding window operation of an embodiment of the present invention showing fragmentation/reassembly and in-order delivery where ARQ manages its window in fix sized blocks. 210 shows the window started, 205 is expected and 215 is last received. Therefore an IP packet from higher layer, a.k.a, service data units (SDU), may be fragmented and transmitted at different times. For example, MAC packet #1, #2 and #3 can be from the same SDU. The SDU will only be passed to the higher layer when all blocks (those in #1 #2 and #3) are delivered correctly.

ARQ may also have an in-order delivery option enabled, where the ARQ's sliding window does not deliver a successfully received MAC packet unless all previous packets in the sliding window have been delivered.

As stated above, in the next generation broadband wireless network, relay networks are a promising solution to enhance cell coverage and network capacity. Although the benefits are significant, relay networks pose new challenges in the network protocol design. For ARQ, the interesting question is whether ARQ should be implemented as a end-to-end (E2E) protocol or a hop-by-hop (HbH) protocol.

Figure 3:
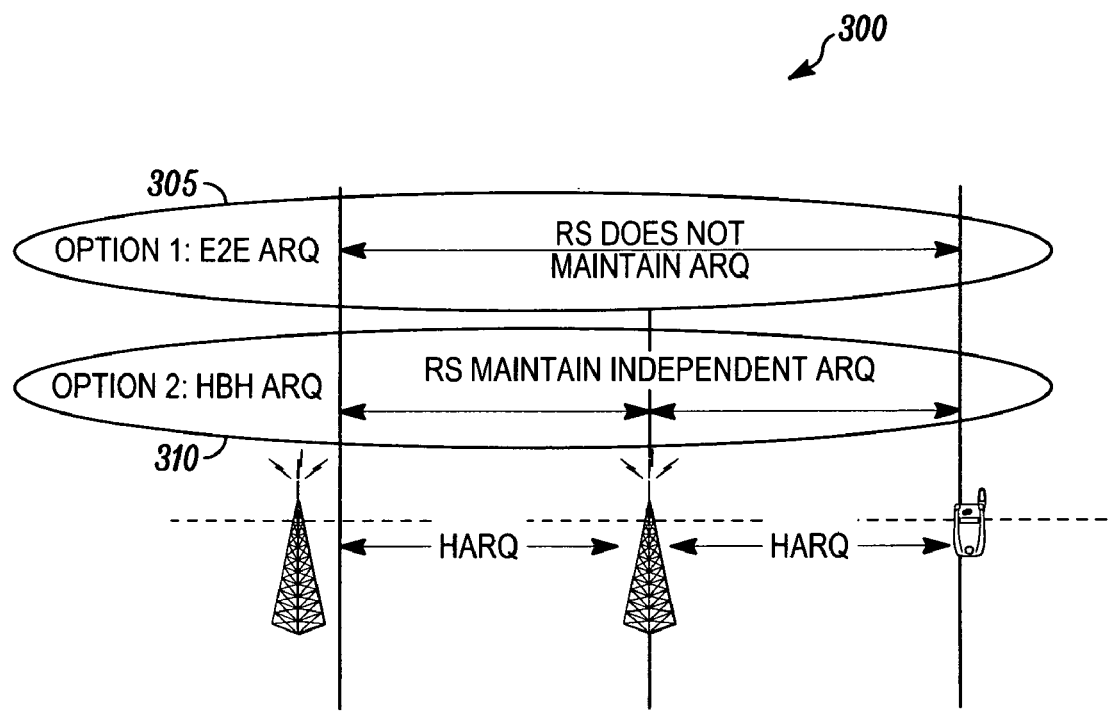
FIG. 3 illustrates an end to end (E2E) and hop by hop (HbH) ARQ in an infrastructural relay network of an embodiment of the present invention.

Looking now at FIG. 3 is an illustration of an end to end (E2E) 305 and hop by hop (HbH) 310 ARQ in an infrastructural relay network of an embodiment of the present invention. As shown in FIG. 3, the relay station (RS) is transparent to E2E ARQ 305. All ARQ states are maintained at the base station (BS) and mobile station (MS). Any signaling and retransmissions will also between base station (BS) and mobile station (MS), i.e., in an E2E fashion. Option 2, HbH ARQ is shown at 310.

Figure 4:
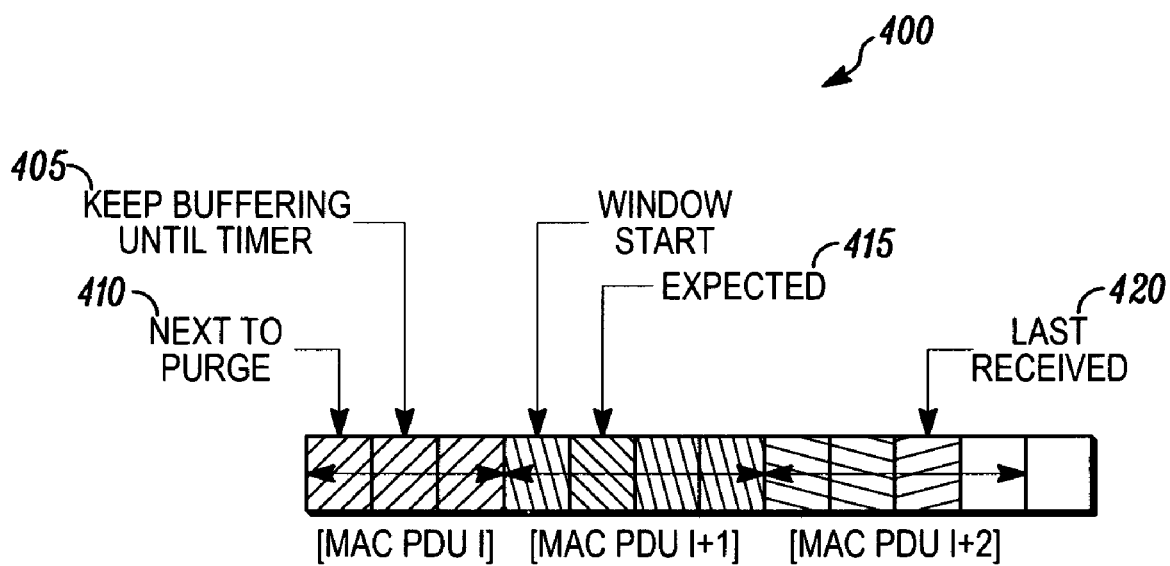
FIG. 4 shows extra buffering at ARQ after HARQ-generated ACK, for correcting HARQ feedback errors of an embodiment of the present invention.

Looking now at FIG. 4 at 400 there is shown extra buffering 405 at ARQ after HARQ-generated ACK, for correcting HARQ feedback errors of an embodiment of the present invention that is prior to window start 412, expected 415 and last received 420. Embodiments of the present invention may contains the following elements:

Coupled HbH ARQ-HARQ operations;
Modified HbH ARQ state machine and protocol design;
Optimized configuration for HbH ARQ;
Couple HbH ARQ-HARQ operations; and
Maintain E2E reliability with HbH ARQ implementation.

Previously, inventors of the present application have provided a mechanism for coupling ARQ/HARQ operations in a regular 802.16 WiMAX network. Coupling HARQ will handle most of the error correction and ARQ will handle residual HARQ errors, HARQ feedback errors and in-order packet delivery. Embodiments of the present invention may use this same technique in a relay network. In a relay network, each hop is treated as an equivalent "link" in a regular network. At the physical layer (PHY), each hop performs HARQ independently from other hops. On top of HARQ, ARQ can be coupled with per-hop HARQ and provide extra reliability, HARQ feedback error protection and optional in-order delivery for this hop.

There are at least two direct benefits when coupling HbH ARQ-HARQ. The first is reduced ARQ feedback overhead, just as in a regular network. ARQ feedback is not necessary unless a HARQ feedback error was detected. The second is faster error correction. As soon as PHY layer HARQ error is detected, due to either residual error after maximal number of retransmissions or HARQ feedback error, ARQ feedback can be triggered immediately. In the case of uncoupled HARQ/ARQ, the ARQ's feedback is triggered by a timer, whose value is conservatively set to accommodate delay fluctuations due to HARQ retransmissions. The extra delay due to uncoupled operation can be large particularly in an asynchronous HARQ implementation, where HARQ retransmission interval depends on scheduling instead of being fixed. These benefits exist in regular networks and are even more significant in relay networks.

It is noted that a new pointer needs to be maintained as "next-to purge" 410 as shown in FIG. 4. After HARQ/ARQ coupling, ARQ will keep buffering the acknowledged data for some time, in case the last HARQ ACK (and the subsequent implied ARQ ACK) was an error. The extra buffer time allows ARQ RX, which detects such an error, generates a (real) ARQ feedback, also called as E2E ARQ feedback, and assures the packet is retransmitted. Note the extra buffer will be no more than the buffer requirement for non-coupling case.

Figure 5:
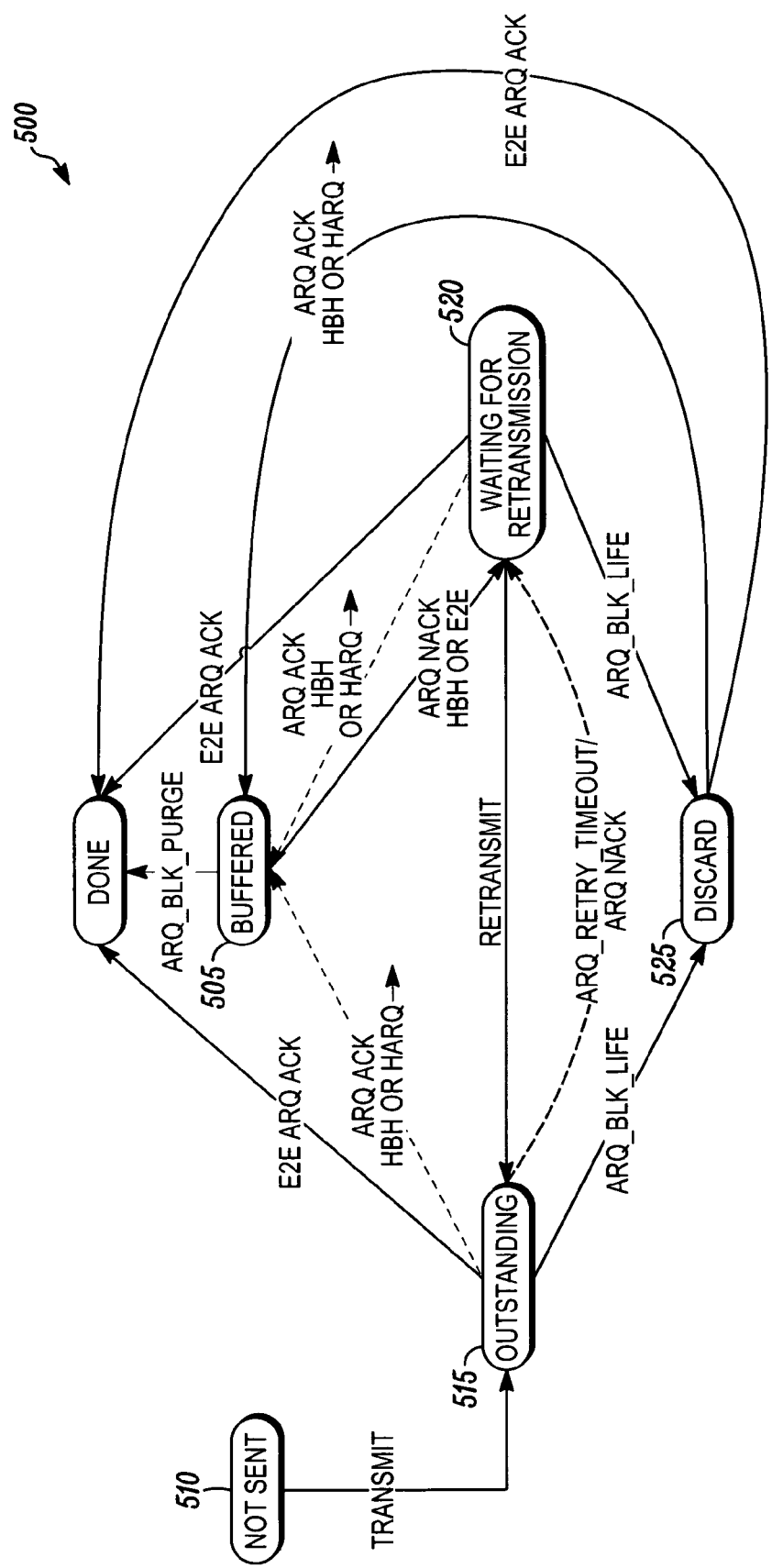
FIG. 5 depicts a modified ARQ (Transmitter) state machine to enable HARQ/ARQ coupling and Relay deployment of an embodiment of the present invention.

Turning to FIG. 5 provides a depiction of a modified ARQ (transmitter) state machine to enable HARQ/ARQ coupling and relay deployment of an embodiment of the present invention. FIG. 5 depicts the following states: not sent 510, outstanding 515, discard 525, waiting for retransmission 520, buffered 505 and done 500. The proposed change on existing single hop ARQ may be as follows:

A new "buffered" state is added, when the block is locally ACKed (with or without HARQ coupling);
Distinguish different ACK(NACK). HbH local ARQ ACK or HARQ-generated ACK will lead to "buffered" state;
In "buffered" state, if an ARQ NACK (outer HbH ARQ NACK or E2E ARQ NACK) comes, this block goes back to "retransmission" state;
Only E2E ARQ ACK (directly from the end receiver and propagated back to the sender) or ARQ_BLOCK_PURGE triggered for "buffered" block lead to "Done" state. ARQ_BLOCK_PURGE can be any range from minimal end-to-end round-trip-delay to ARQ_BLOCK_LIFETIME. Its minimal value also should ensure that, in case an E2E ARQ NACK arrivals, e.g., during HO, all relevant ARQ state still exist and can be successfully transferred.

Note that HbH ARQ does not require HARQ/ARQ coupling. If not specified, it is assumed NO HARQ/ARQ coupling subsequently.

In an embodiment of the present invention, the ARQ window shall be maintained with consistence across all hops, which means a block sequence number will carry the same meaning (referring to the same chunk of data) at any given hop. This is the simplest implementation to achieve E2E reliability and the present invention is not limited in this respect. Therefore, an E2E ARQ feedback can be understood at any given hop. Without additional resource re-mapping, each hop that maintains HbH ARQ state may update their state machine according to the ARQ activity. Otherwise, each hop is required to maintain a mapping for all blocks in the active window, which in theory is feasible but incurs some extra complexity. HbH ARQ requires each hop, BS-RS RS-RS or RS-MS, maintain ARQ state and perform retransmissions if necessary. With proper state maintenance in HbH ARQ, E2E reliability is not compromised but enhanced. Since all hops now are capable of ARQ retransmission in HbH ARQ, E2E ARQ is actually a worst case of HbH ARQ where all intermediate hops choose to simply forward the retransmission request back to the original TX.

Figure 6:
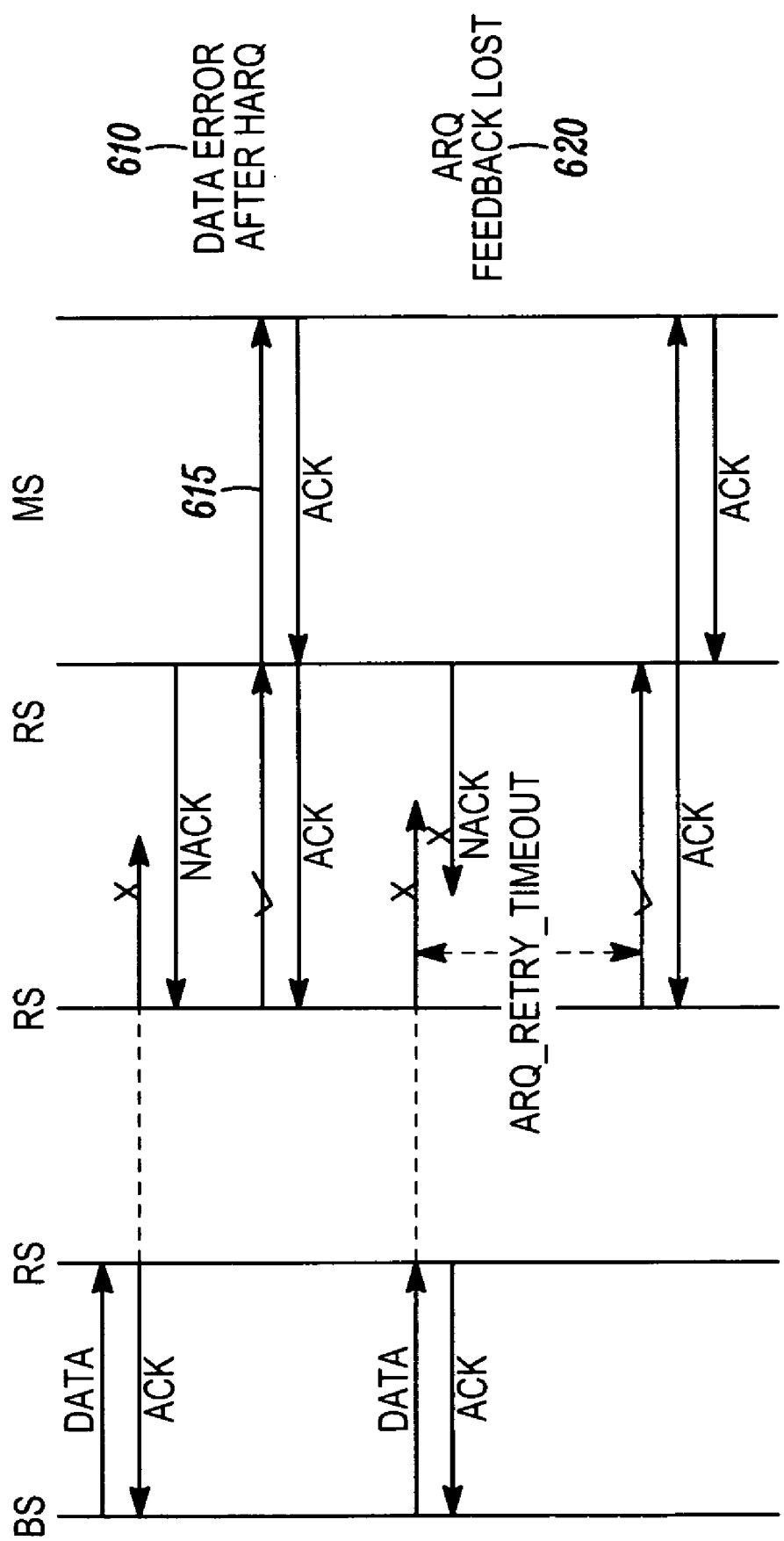
FIG. 6 illustrates an HbH ARQ operation of an embodiment of the present invention.

Looking at FIG. 6 at 600 is an illustration of an HbH ARQ operation of an embodiment of the present invention. As shown in FIG. 6, when a data transmission or feedback was in error 610, the error correction will be achieved via local retransmission. Compared to E2E ARQ, the retransmission delay will roughly be m, where m is the number of hops in the network, times larger than HbH ARQ.

Similarly, if one considers retransmission overheads when an error occurs, it can be shown HbH also has less retransmission overhead than E2E ARQ. Assuming the error happened at the last hop RS-MS, which usually is the most unreliable link, and the error can be corrected by one retransmission, the retransmission overhead of HbH ARQ is only 1/m of that in E2E ARQ. If it takes n retransmissions to correct the error, the overhead saving from HbH will be very significant.

If there is no HARQ/ARQ coupling, the feedback overhead 620 is comparable. HbH ARQ has feedback at each hop. E2E ARQ has one feedback by relay across all hops. However, HbH ARQ with HARQ/ARQ coupling will significantly reduce feedback overhead, where ARQ feedback transmission is only necessary when HARQ feedback errors occur, which happen with a very small probability. The feedback overhead saving is on the order of 100(1-p) %, i.e., the more reliable HARQ feedback channel is, the more savings in feedback overhead for HbH ARQ.

Figure 7:
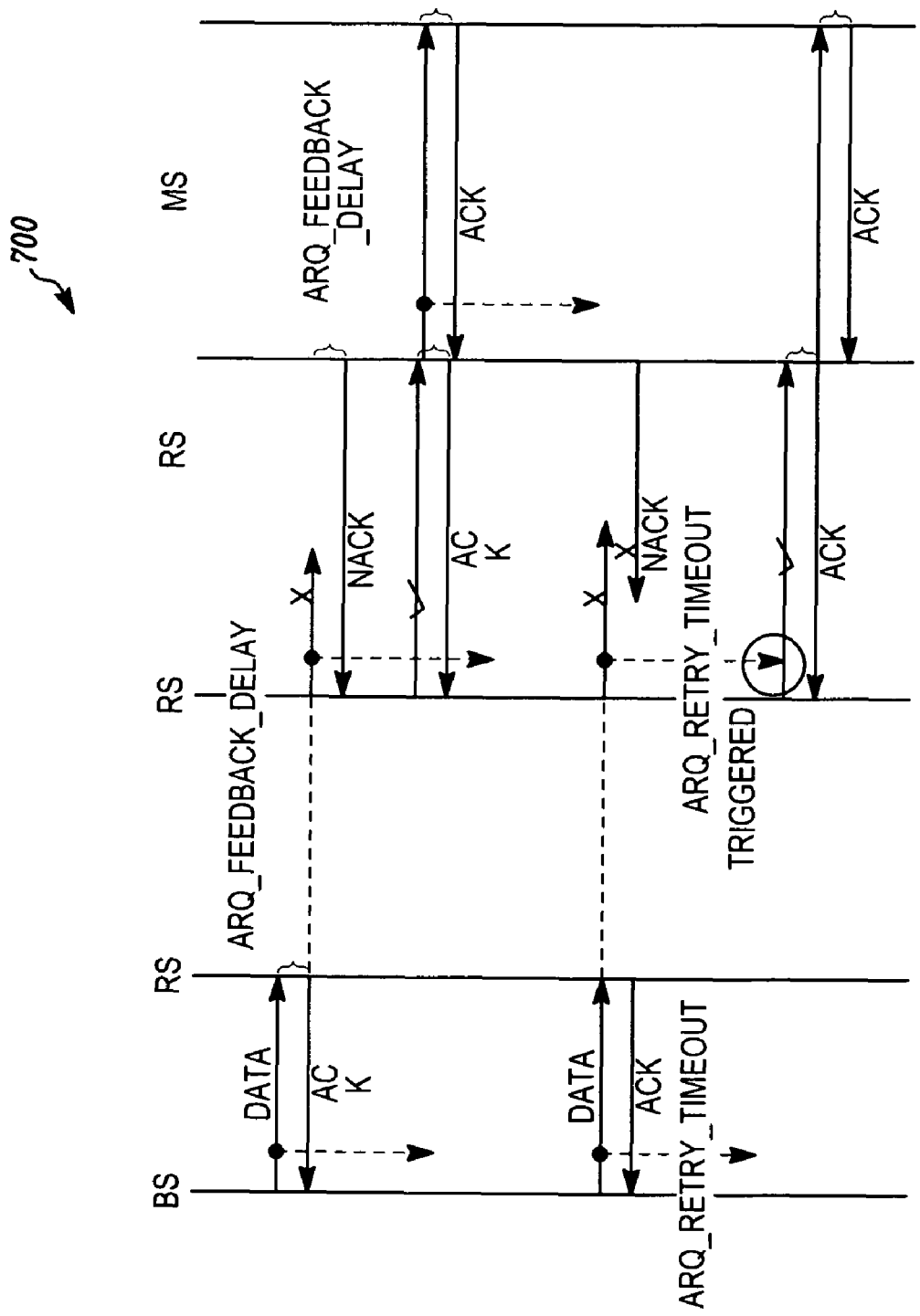
FIG. 7 shows that when in-order delivery enabled at each hop, ARQ_Feedback_Delay and ARQ_RETRY_TIMEOUT timers are the same at each hop of an embodiment of the present invention.

Turning now to FIG. 7 at 700, shows that when in-order delivery enabled at each hop, ARQ_Feedback_Delay and ARQ_RETRY_TIMEOUT timers are the same at each hop of an embodiment of the present invention.

HbH ARQ requires proper configurations in order to work properly and efficiently in a relay network.

In-order packet delivery: With possible HARQ retransmissions, packet arrivals at each hop may be out of order. For example, if packet #1, #2, . . . , #i are transmitted at HARQ burst 1 at time 1 but was in error and got retransmitted a few times and were finally received correctly at time k. Meanwhile packets #i,#i+1, . . . #k are transmitted in HARQ burst 2 at time 2. The received order at the receiver will be #i+1, . . . , #k, #1, #2, . . . #i. In-order packet delivery will hold packets #i+1, . . . , #k without delivering them to next hop or higher layer until all previous packets are also received.

When in-order packet delivery is necessary, there are three options available for HbH ARQ. Enable in-order pkt delivery at each hop; or enable it only at the last hop; or a hybrid approach to enable it at selected hops. Both options are viable and have pros and cons under different scenarios.

Per hop in-order delivery. Since later packets will wait for all previous packets, enabling this option will increase the mean end-to-end packet delay. Fortunately because i) most BS-RS links are usually good with very small errors probabilities, i.e., less HARQ retransmissions; and ii) A few HARQ retransmissions are mostly still faster than scheduling/sending the next HARQ burst, the increase in mean delay is very marginal according to simulations. On the other hand, per-hop reordering helps to eliminate packet arrival delay jitters and quite often gives less variance in end-to-end packet delay. Less variance sometimes is a desirable property for higher layer protocols. Note with per hop in-order delivery, all ARQ related timers may be on the same order of magnitude across all hops, because they only need to handle 1-hop delay fluctuation.

Figure 8:
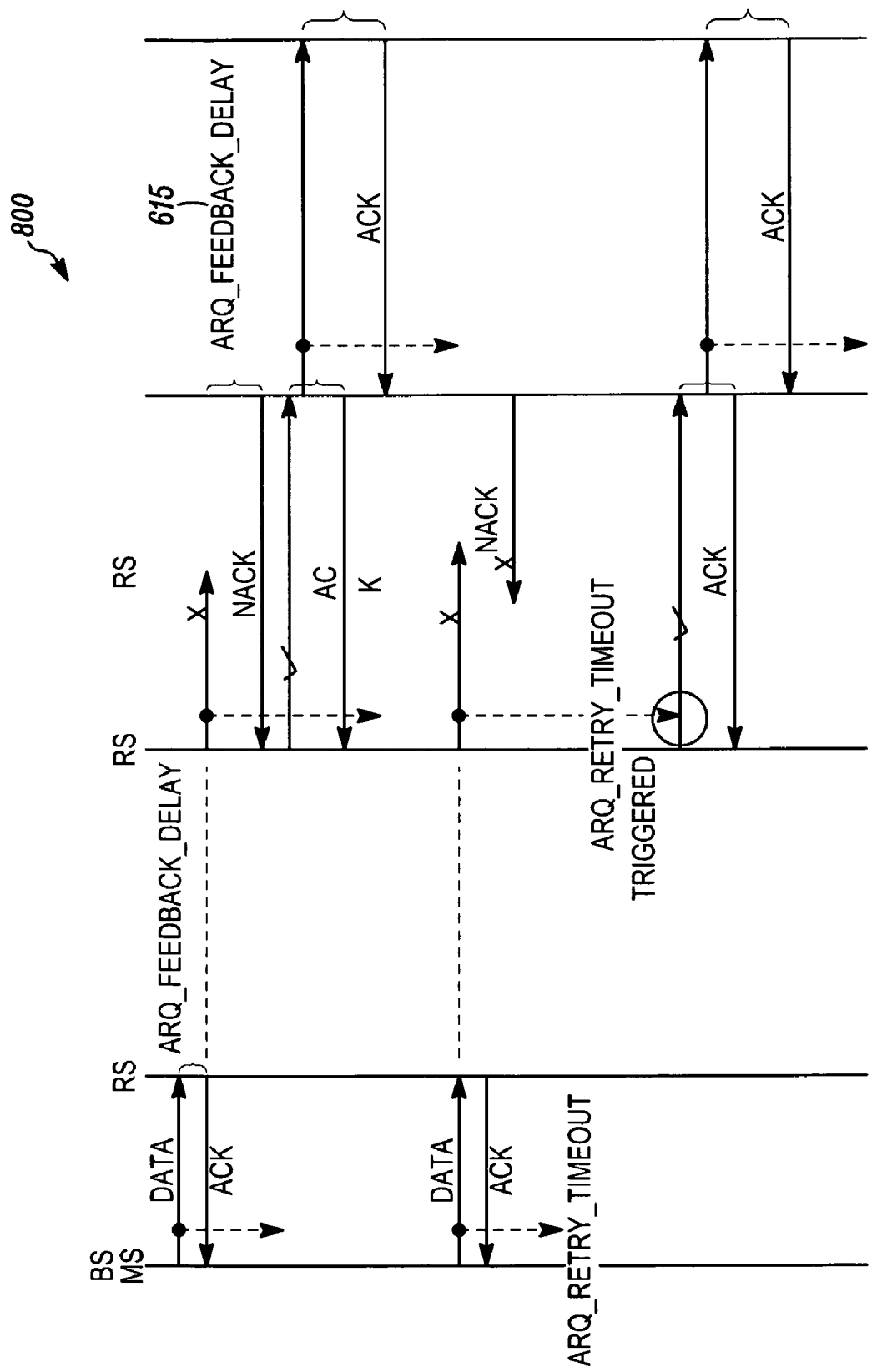
FIG. 8 illustrates HbH ARQ without per-hop reordering of an embodiment of the present invention.

FIG. 8 illustrates generally at 800 HbH ARQ without per-hop reordering of an embodiment of the present invention. Last hop in-order delivery is to only enable at the last receiver, e.g., in the downlink this is the MS and in the uplink this is the BS. This approach minimizes the mean end-to-end delay because packets transmitted at different times do not have to wait for each other. However, this approach contributes large variances in end-to-end packet delay since fluctuations at each hop add up. One also needs to design ARQ_RETRY_TIMEOUT and ARQ_Feedback_Delay carefully to avoid premature retransmission/feedback. Along the route at a given hop i, these timers must be large enough to handle mean delay and aggregated delay variance from hop 1 up to hop i. As a result, hop i's ARQ timers will be roughly i times larger than those of hop 1. This will still give less delay for retransmissions compared to E2E ARQ, particularly for errors on intermediate links.

Figure 9:
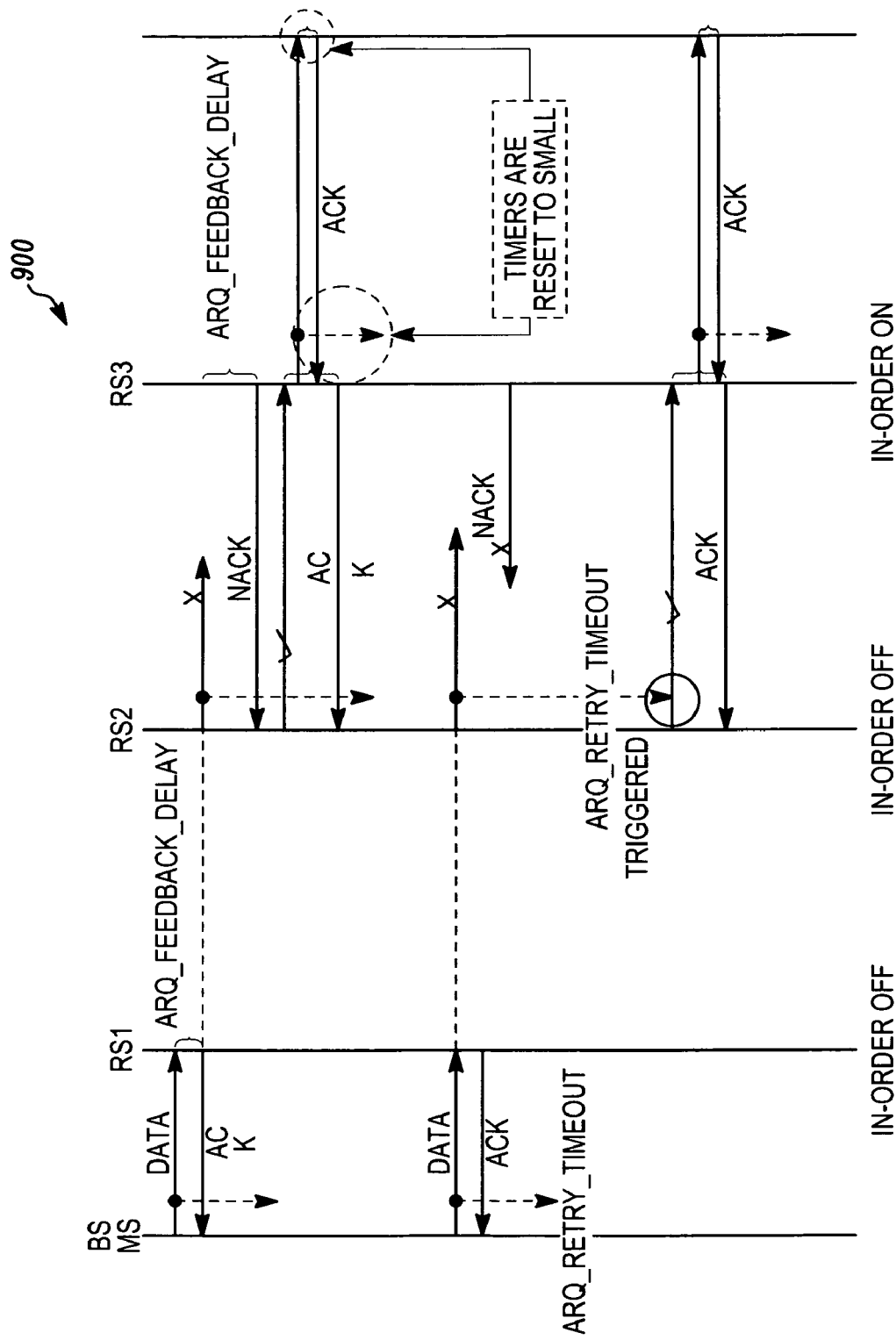
FIG. 9 shows a hybrid case of in-order delivery, where timers are reset to a small value when it reaches the hop with this option ON of an embodiment of the present invention.

FIG. 9, generally at 900, shows a hybrid case of in-order delivery, where timers are reset to a small value when it reaches the hop with this option ON of an embodiment of the present invention. If necessary, one can choose to enable this at selected hops. A reasonable approach is to enable this at the last hop (BS and MS) and the last RS serving the MS. Therefore, BS-last RS and last RS-MS will both have in-order packet delivery. Since BS-RS links are usually of good quality, this approach makes sense to balance the mean delay and delay variance without compromising fast error recovery. In this case, along the route, at each hop where in-order packet delivery is turned on, the timer setting will be reduced back to the small value. This set up also allows to implement MAC efficiency protocols on a wireless backbone between BS and RS, such as connection aggregation between BS-RS to reduce MAC overhead.

ARQ outer feedback: As mentioned, actual ARQ feedbacks (not the implicit ARQ feedback generated from HARQ feedback) are needed in HARQ feedback errors or HARQ residual packet errors. Most of the time, such errors can be corrected locally, and thus these "outer" ARQ feedbacks by default are transmitted only at local hop and will not propagate to other hops down the route as it will incur extra overheads.

In some cases, outer ARQ feedbacks may be propagated along the route to all hops. In, the case that an outer ARQ ACK is propagated, it can release unnecessary buffering along the route all the way back to the original TX. There could be different reasons that an outer ARQ NACK is required to be propagated. One example is a packet error that can not be retransmitted or corrected at its local hop, possibly due to pre-matured buffer purge of data by the local TX. Either the earliest hop that can retransmit the corresponding data or the original TX initiates retransmission and tries to correct the error. All the downstream hops will update their ARQ state accordingly. It is up to implementation to determine whether this outer ARQ NACK will continue to be propagated in upstream toward the original TX when an intermediate hop triggers the retransmission. Another example is during handover (between two relay stations or two different cells), the propagated ARQ NACK enables ARQ context transfer between serving and target RS or BS. If a handover is between two RSs sharing a common root RS, HbH ARQ allows such a context transfer to happen with minimal number of RS involved. This is particularly useful to reduce system overhead without compromising data E2E reliability during HO.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

We claim:

1. An apparatus, comprising:
a transceiver adapted for use in a hop by hop (HbH) relay network and configured to reduce ARQ overhead by coupling HARQ and ARQ feedback signaling in each hop of said HbH relay network;
wherein each hop is treated as an equivalent link in a regular network;
wherein at the physical layer (PHY), each hop performs HARQ independently from other hops; and
wherein on top of HARQ, ARQ is coupled with per-hop HARQ and a new buffered state is added when a block is locally ACKed, and different ACKs are distinguished such that a HbH local ARQ ACK or HARQ-generated ACK will lead to said buffered state, and wherein in said buffered state, if an ARQ NACK comes, said block goes back to a retransmission state.

2. The apparatus of claim 1, further comprising a pointer maintained as next-to-purge, wherein after HARQ/ARQ coupling, ARQ will keep buffering acknowledged data for a period of time in the event that a last HARQ ACK and subsequent implied ARQ ACK was an error and wherein the extra buffer time allows an ARQ Receiver that detects such an error to generate an ARQ feedback and get a packet retransmitted.

3. An apparatus, comprising:
a transceiver configured to use a hop-by-hop approach for automatic repeat request (ARQ) in wireless relay networks, wherein said transceiver uses a buffered state when a block is locally ACKed and wherein different ACKs/NACKs are distinguished such that hop by hop (HbH) local ARQ ACK or HARQ-generated ACK will lead to said buffered state and in said buffered state, if an ARQ NACK comes, a block with this transmission goes back to a retransmission state;
wherein each hop is treated as an equivalent link in a regular network;
wherein at the physical layer (PHY), each hop performs HARQ independently from other hops; and
wherein on top of HARQ, ARQ is coupled with per-hop HARQ and a new buffered state is added when the block is locally ACKed, and different ACKs are distinguished such that a HbH local ARQ ACK or HARQ-generated ACK will lead to said buffered state, and wherein in said buffered state, if an ARQ NACK comes, said block goes back to a retransmission state.

4. The apparatus of claim 3, wherein only end to end (E2E) ARQ ACKs that are directly from an end receiver and propagated back to a sender or ARQ_BLOCK_PURGE triggered for buffered blocks lead to a "Done" state.

5. The apparatus of claim 4, wherein ARQ_BLOCK_PURGE is any range from minimal end-to-end round-trip-delay to ARQ_BLOCK_LIFETIME.

6. The apparatus of claim 4, wherein an ARQ window is maintained with consistence across all hops.

7. An apparatus, comprising:
a transceiver configured to use a hop-by-hop approach for automatic repeat request (ARQ) in wireless relay networks, wherein said configuration requires in-order packet delivery, last hop in-order delivery or a hybrid of in-order packet delivery or last hop in-order delivery, and ARQ outer feedback;
wherein each hop is treated as an equivalent link in a regular network;
wherein at the physical layer (PHY), each hop performs HARQ independently from other hops; and
wherein on top of HARQ, ARQ is coupled with per-hop HARQ and a new buffered state is added when a block is locally ACKed, and different ACKs are distinguished such that a HbH local ARQ ACK or HARQ-generated ACK will lead to said buffered state, and wherein in said buffered state, if an ARQ NACK comes, said block goes back to a retransmission state.

8. The apparatus of claim 7, further comprising at least one timer large enough to handle mean delay and aggregated delay of variances from the first to last hop.

9. A method, comprising:
reducing ARQ overhead in a transceiver in a hop by hop (HbH) relay network by coupling HARQ and ARQ feedback signaling in each hop of said HbH relay network;
wherein each hop is treated as an equivalent link in a regular network;
wherein at the physical layer (PHY), each hop performs HARQ independently from other hops; and
wherein on top of HARQ, ARQ is coupled with per-hop HARQ and a new buffered state is added when a block is locally ACKed, and different ACKs are distinguished such that a HbH local ARQ ACK or HARQ-generated ACK will lead to said buffered state, and wherein in said buffered state, if an ARQ NACK comes, said block goes back to a retransmission state.

10. The method of claim 9, further comprising using a pointer maintained as next-to-purge, wherein after said HARQ/ARQ coupling, said ARQ will keep buffering acknowledged data for a period of time in the event that a last HARQ ACK and subsequent implied ARQ ACK was an error and wherein the extra buffer time allows an ARQ Receiver that detects such an error to generate an ARQ feedback and get a packet retransmitted.

11. A method, comprising:
using a hop-by-hop approach in a transceiver for automatic repeat request (ARQ) in wireless relay networks, wherein said transceiver uses a buffered state when a block is locally ACKed and wherein different ACKs/NACKs are distinguished such that hop by hop (HbH) local ARQ ACK or HARQ-generated ACK will lead to said buffered state and in said buffered state, if an ARQ NACK comes, a block with this transmission goes back to a retransmission state;
wherein each hop is treated as an equivalent link in a regular network;
wherein at the physical layer (PHY), each hop performs HARQ independently from other hops; and
wherein on top of HARQ, ARQ is coupled with per-hop HARQ and a new buffered state is added when the block is locally ACKed, and different ACKs are distinguished such that a HbH local ARQ ACK or HARQ-generated ACK will lead to said buffered state, and wherein in said buffered state, if an ARQ NACK comes, said block goes back to a retransmission state.

12. The method of claim 11, wherein only end to end (E2E) ARQ ACKs that are directly from an end receiver and propagated back to a sender or ARQ_BLOCK_PURGE triggered for buffered blocks lead to a "Done" state.

13. The method of claim 12, wherein ARQ_BLOCK_PURGE is any range from minimal end-to-end round-trip-delay to ARQ_BLOCK_LIFETIME.

14. The method of claim 12, further comprising maintaining an ARQ window with consistence across all hops.

15. A method, comprising:

using a hop-by-hop approach in a transceiver for automatic repeat request (ARQ) in wireless relay networks, wherein a configuration requires in-order packet delivery, last hop in-order delivery or a hybrid of in-order packet delivery or last hop in-order delivery, and ARQ outer feedback;

wherein each hop is treated as an equivalent link in a regular network;

wherein at the physical layer (PHY), each hop performs HARQ independently from other hops; and wherein on top of HARQ, ARQ is coupled with per-hop HARQ and a new buffered state is added when a block is locally ACKed, and different ACKs are distinguished such that a HbH local ARQ ACK or HARQ-generated ACK will lead to said buffered state, and wherein in said buffered state, if an ARQ NACK comes, said block goes back to a retransmission state.

16. The method of claim 15, further comprising using at least one timer large enough to handle mean delay and aggregated delay of variances from the first to last hop.

* * * * *